United States Patent [19]

Pan et al.

[11] 4,118,270

[45] Oct. 3, 1978

[54] MICRO LENS FORMATION AT OPTICAL FIBER ENDS

[75] Inventors: Jing Jong Pan; Milton Phillip Arnold, both of Melbourne; James Castle Barton, Indialantic, all of Fla.

[73] Assignee: Harris Corporation, Cleveland, Ohio

[21] Appl. No.: 658,880

[22] Filed: Feb. 18, 1976

[51] Int. Cl.$^2$ .................. C03C 25/06; C03C 25/02; G02B 5/14

[52] U.S. Cl. .................. 156/659; 156/654; 350/96.18; 427/163; 427/273; 427/275; 427/430 R

[58] Field of Search .................. 196/2, 8, 15, 345, 24; 350/96 C, 175 NG, 175 SL, 178, 96.18; 156/625, 659, 663, 668, 904, 654, 651; 427/162–164, 169, 272, 273, 275, 259, 287, 430 R, 430 B

[56] References Cited

U.S. PATENT DOCUMENTS

| | | | |
|---|---|---|---|
| 2,239,536 | 4/1941 | Muros | 427/284 X |
| 2,328,533 | 8/1943 | Walker | 350/178 |
| 2,400,877 | 5/1946 | Dreyer | 427/169 X |
| 2,543,019 | 2/1951 | Henroteau et al. | 156/24 |
| 2,699,670 | 1/1955 | Becton | 427/272 X |
| 2,995,970 | 8/1961 | Hicks, Jr. et al. | 156/24 UX |
| 3,136,310 | 6/1964 | Meltzer | 350/175 SL |
| 3,243,867 | 4/1966 | Bernstein | 427/284 X |
| 3,454,686 | 7/1969 | Jones | 350/178 UX |
| 3,699,021 | 10/1972 | Shaffer et al. | 431/93 |
| 3,805,347 | 4/1974 | Collins et al. | 350/178 |
| 3,972,585 | 8/1976 | Dalgleish et al. | 350/96 C |
| 3,995,935 | 12/1976 | McCartney | 350/96 C |

*Primary Examiner*—William A. Powell
*Assistant Examiner*—Thomas Bokan

[57] ABSTRACT

Method of formation of lenses at optical fiber ends to increase the coupling efficiency thereof. In a first embodiment, the end of the optical fiber is masked with a substance non-soluble in the etching reagent. The portion of the coating at the very end of the fiber is then removed and the fiber end immersed in an etching reagent. The etching reagent serves to dissolve the uncoated portion of the fiber. By controlling the amount of time that the fiber end is in the reagent, different lens shapes may be formed. In a second embodiment, the fiber end is dipped into a liquid epoxy compound whereby a portion of the epoxy is deposited onto the fiber end. The surface tension of the portion deposited thereon draws the liquid epoxy into the desired lens shape. The epoxy is then hardened to form a permanent lens structure on the fiber end.

6 Claims, 10 Drawing Figures

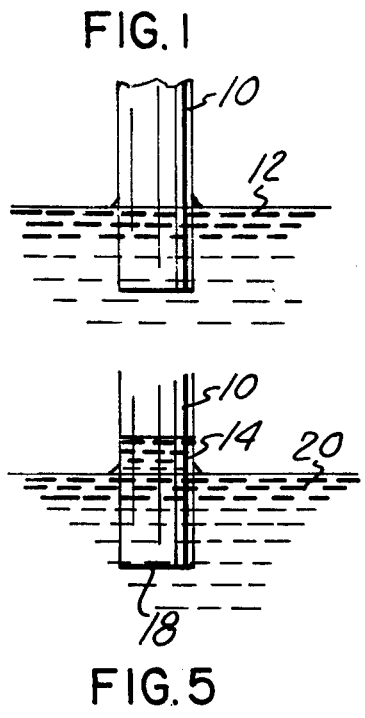
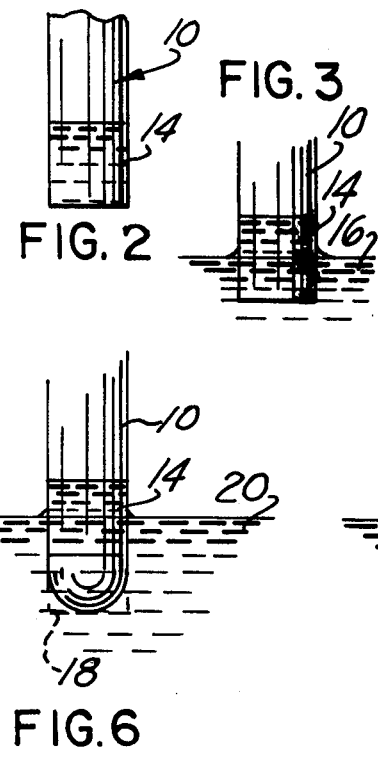
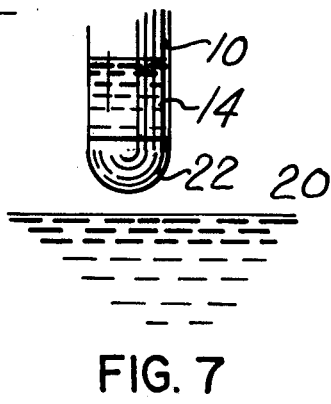
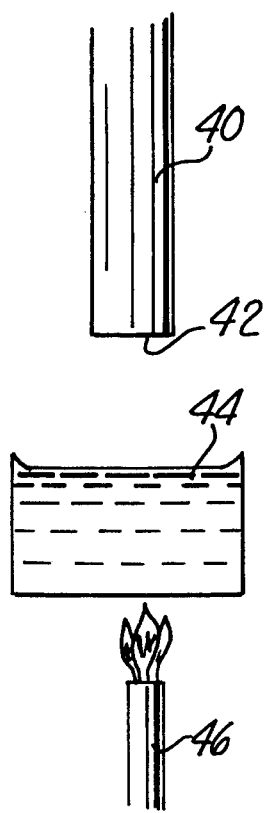
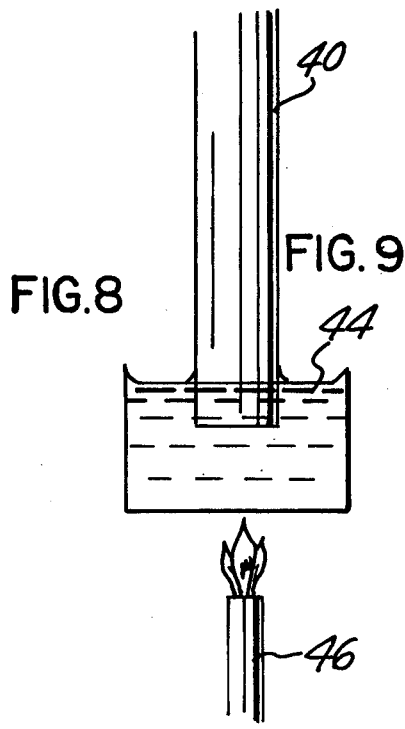
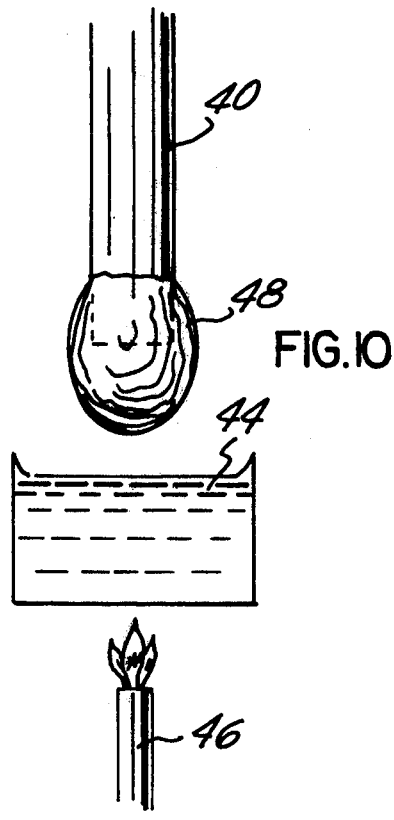

MICRO LENS FORMATION AT OPTICAL FIBER ENDS

The present invention relates to the art of fiber optics and more particularly to the art of lens formation at optical fiber ends.

In recent years fiber optic technology has seen increasing use in a variety of widely diverse fields. The use of these technologies in many arts requires that the coupling efficiency of the fiber, i.e. the ability to gather light directed at the fiber end, be as high as possible. Specifically, the present trend toward the use of individual optical fibers in communications systems has pointed out the need for a lens at the end thereof. Without the lens, the fiber couples less than one percent of the power transmitted by a light emitting diode (LED) or twenty percent of the power emitted by an injection laser diode (ILD). With a lens attached thereto, the coupling efficiency can be improved by substantial amounts. This improvement can lead to commensurate improvements in transmission distance and signal to noise ratio.

Several methods of forming lenses at optical fiber ends have been previously reported. These include thermal melting techniques, mechanical grinding and polishing processes, and the attachment of a discrete lens to the fiber end. In each case drawbacks are associated therewith, including difficulties of manufacture and high costs. The methods involving direct fabrication of a lens onto the end of the fiber are preferable to the attachment of a discrete lens because the former approach has the advantages of mechanical simplicity and freedom from complicated alignment procedures.

It is therefore an object of the present invention to provide methods of directly fabricating lenses onto optical fibers.

It is another object of the present invention to provide methods which are inexpensive, accurate and easily accomplished.

It is yet another object of the present invention to provide methods which allow control of the shape of the lenses so formed.

In accordance with one aspect of the invention, a method is provided of immersing an optical fiber end into a selected liquid whereby a drop thereof is deposited on the fiber end. The natural surface tension of the drop of liquid draws it into the desired lens shape. The process is completed by solidifying the drop to permenantize the lens so formed.

In accordance with another aspect of the present invention, a method is provided of immersing the optical fiber end into an etching reagent to remove a portion thereof by chemical dissolution until that portion remaining has the desired lens shape. The shape of the lens so formed can be controlled by varying the length of time that the optical fiber end is attacked by the reagent.

DESCRIPTION OF THE PREFERRED EMBODIMENT

The foregoing and other objects and advantages of the present invention will become more readily apparent from the following description of the preferred embodiments as taken in conjunction with the accompanying drawings which are a part hereof and wherein:

FIGS. 1 through 7 illustrate the formation of a lens on an optical fiber end through the method of etching; and, FIGS. 8 through 10 illustrate the formation of a lens on an optical fiber end through the method of epoxy deposition.

As shown in FIGS. 1 through 7, the etching method may be accomplished by first dipping at least the end portion of an optical fiber 10 into a masking solution 12. Masking solution 12 may conveniently comprise a lacquer or lacquer-like substance. This forms a coating 14 on the portion of optical fiber 10 so immersed in masking solution 12. The coating 14 is then removed from the end portion of optical fiber 10 by dipping the end into a second solution 16 which serves to dissolve the portion of the coating exposed thereto. Solution 16 may take the form of any convenient chemical compound which will dissolve coating 14 without significantly affecting optical fiber 10.

The result of this, as shown in FIG. 4, is an optical fiber 10 having a coating 14 on at least a portion thereof and an end portion 18 from which the coating has been removed. The fiber is then dipped into an etching compound 20 such that the end portion 18 begins etching therein. The fiber can be immersed to the extent of the coated portion 14, the coating compound having been selected to be resistant to the etching solution. The etching solution may take the form of a solution of hydrofluoric acid. The etching solution will attack the exposed portion of fiber 10, eventually forming lens 22 thereon. By controlling the portion of fiber 10 exposed to etching solution 20, rate of etching, and time of exposure, the shape of the lens so formed can be controlled. Either hyperbolic or spherical lenses can be formed through the use of this method.

The purpose of providing the masking 14 is to control the portion of fiber 10 attacked by solution 20. Such control would otherwise be difficult because of the characteristic fuming of many solutions. At the conclusion of the lens formation, the remainder of masking 14 can be removed in any convenient manner as, for example, by dipping that portion of the fiber back into solution 16.

As with hydrofluoric acid, the use of such fuming solutions can be successfully accomplished by merely suspending the fiber end 18 above the solution 20. The fumes thereof will condense on the fiber end 18, dissolve a portion thereof, and drip back into the solution.

It will be appreciated that any convenient manner of protecting the remainder of the fiber may be utilized, the invention not being limited to the details of the masking method described. Further, it may be unnecessary to mask the fiber at all if a sufficiently nonvolatile reagent is used.

Referring now to FIGS. 8 through 10, a method of lens formation including epoxy deposition is illustrated. An optical fiber 40 having an end 42 is dipped into a light transmissive epoxy coating resin 44 which has been melted by a heat source 46. Upon removal of optical fiber 40 from epoxy 44 a drop 48 thereof is deposited on the fiber end portion. The natural surface tension of the epoxy so deposited will draw the droplet into a spherical or hyperbolic shape, depending on the consistancy of epoxy 44 on the amount of optical fiber 10 so immersed. The epoxy can then be allowed to harden, thus permanently forming the lens thereon.

Although the invention is described with reference to preferred embodiments, it will be appreciated the many alterations of the methods described herein can be made without departing from the spirit and scope of the invention as defined in the appended claims.

What is claimed is:

1. The method of forming a lens onto the end of an optical fiber through chemical etching, said optical fiber end having a general contour which is different then the desired lens shape, comprising the steps of:

immersing said fiber end into an etching solution to such an extent that the entire said fiber end is immersed in said etching solution and so that the entire cross-sectional surface of said fiber end is etched by said etching solution, timing said immersion for an interval being long enough to allow removal of enough of said fiber end by the action of said etching solution alone so that only the desired lens shape remains, and removing said fiber end from said etching solution at the conclusion of said interval.

2. The method of claim 1 wherein the step of timing said immersion includes the step of selecting the length of said interval in accordance with the desired shape of the lens to be formed.

3. The method of forming a lens onto the end of an optical fiber comprising the steps of masking a longitudinal section of said fiber adjacent the fiber end with a coating which is nonsoluble in a selected etching solution, and immersing at least the entire said fiber end into said selected etching solution to remove uncoated portions thereof through the action of said etching solution, alone, to the extent that only the desired lens shape remains.

4. The method of claim 3 wherein the step of masking a section of said fiber comprises the steps of coating said fiber end together with said longitudinal section adjacent thereto with said coating which is nonsoluble in said selected etching solution and removing said coating so formed from said fiber end so that only said longitudinal section adjacent said fiber end remains coated.

5. The method of claim 4 wherein said longitudinal section comprises the entire said fiber except said fiber end.

6. A method of forming a lens on an optical fiber end comprised of the steps of immersing a selected amount of said fiber end into an optically transparent liquid, withdrawing said fiber end from said liquid so that only a drop of said liquid remains on said fiber end and the surface tension of said drop draws said liquid into the desired lens shape, and hardening said liquid so as to form a solid lens permanently affixed to said fiber end, wherein the resultant lens shape is dependent upon the amount of said fiber immersed in said liquid and wherein said method further comprises the additional step of controlling said selected amount in accordance with the lens shape desired.

* * * * *